(12) United States Patent  (10) Patent No.: US 7,891,493 B2
Dege et al.  (45) Date of Patent: Feb. 22, 2011

(54) FOOD CARRIER (75) Inventors: Paul T. Dege, Grandville, MI (US); Jim C. Nensewitz, Grand Rapids, MI (US); Edward W. Burmeister, Nunica, MI (US); Brian E. Ainsworth, Ada, MI (US)

(73) Assignee: Oliver Packaging and Equipment Company, Grand Rapids, MI (US)

( * ) Notice: Subject to any disclaimer, the term of this patent is extended or adjusted under 35 U.S.C. 154(b) by 0 days.

(21) Appl. No.: 12/836,827

(22) Filed: Jul. 15, 2010

(65) Prior Publication Data

US 2010/0275428 A1  Nov. 4, 2010

Related U.S. Application Data (63) Continuation of application No. 10/968,436, filed on Oct. 19, 2004, which is a continuation of application No. 10/223,128, filed on Aug. 19, 2002, now abandoned, which is a continuation-in-part of application No. 10/073,832, filed on Feb. 11, 2002, now Pat. No. 6,688,470.

(51) Int. Cl.
A45C 11/20 (2006.01)
(52) U.S. Cl. .................................. 206/545; 206/549
(58) Field of Classification Search .......... 206/541, 206/542, 545, 546, 549, 550; 220/524; 190/109, 190/111–114; 383/109, 110, 113
See application file for complete search history.

(56) References Cited

U.S. PATENT DOCUMENTS

| 786,077 A | 3/1905 | Wehmeier et al. |
| 1,006,135 A | 10/1911 | Schleicher |
| 1,304,700 A | 5/1919 | Otte |
| 1,371,007 A | 3/1921 | Urban |
| 1,437,509 A | 12/1922 | Genth |
| 1,511,613 A | 10/1924 | Joern |
| 1,895,864 A | 1/1933 | Ricci |
| 2,211,349 A | 8/1940 | Nye |
| 2,400,742 A | 5/1946 | Clerc |
| 2,531,444 A | 11/1950 | Lane |
| 2,612,651 A | 10/1952 | Roethel |
| 2,771,627 A | 11/1956 | Hammer |
| 2,812,227 A | 11/1957 | Hill |
| 3,152,716 A | 10/1964 | Feldhahn |
| 3,204,866 A | 9/1965 | Brighton et al. |
| 3,531,169 A | 9/1970 | Hoffmann et al. |
| 3,759,356 A | 9/1973 | Bostick et al. |
| 3,842,982 A | 10/1974 | Joyce |
| 3,960,289 A | 6/1976 | Panicci |

(Continued)

*Primary Examiner*—Mickey Yu
*Assistant Examiner*—Melissa L Lalli
(74) *Attorney, Agent, or Firm*—Price, Heneveld, Cooper, DeWitt & Litton, LLP (57) ABSTRACT

A method for carrying a plurality of food containers that includes an insulated housing having a closed bottom, a closed top located substantially vertically above the bottom, and at least one side wall having a first opening proximate the top of the housing and a second opening proximate the bottom of the housing, the first opening being sized to receive at least one meal container therethrough, the second opening being sized to allow removal of at least one meal container from within the housing as received within the housing from the first opening and to preclude simultaneous removal of all of the meal containers from within the housing, thereby limiting heat transfer from within the housing.

14 Claims, 5 Drawing Sheets

FIG. 1

U.S. PATENT DOCUMENTS

| | | | |
|---|---|---|---|
| 4,022,319 A | 5/1977 | Jenkins | |
| 4,216,862 A | 8/1980 | Daenen | |
| 4,269,169 A | 5/1981 | Guibert | |
| 4,328,254 A | 5/1982 | Waldburger | |
| 4,345,143 A * | 8/1982 | Craig et al. | 219/411 |
| 4,376,558 A * | 3/1983 | Bandar | 312/259 |
| 4,435,434 A | 3/1984 | Caporaso | |
| 4,486,981 A | 12/1984 | Billen | |
| 4,498,584 A | 2/1985 | Newbury | |
| 4,499,998 A | 2/1985 | Carlson | |
| 4,543,471 A | 9/1985 | Anderson | |
| 4,570,800 A | 2/1986 | Luckett | |
| 4,643,314 A | 2/1987 | Kidd | |
| 4,659,154 A | 4/1987 | Jenkins | |
| 4,694,961 A | 9/1987 | Menendez | |
| 4,706,856 A | 11/1987 | Jacober | |
| 4,812,054 A | 3/1989 | Kirkendall | |
| 4,840,271 A | 6/1989 | Garwood | |
| 4,941,603 A * | 7/1990 | Creamer et al. | 224/148.3 |
| 4,996,110 A | 2/1991 | Tanuma et al. | |
| 5,036,978 A * | 8/1991 | Frank et al. | 206/494 |
| 5,084,028 A | 1/1992 | Kennedy et al. | |
| 5,090,785 A | 2/1992 | Stamp | |
| 5,095,718 A * | 3/1992 | Ormond et al. | 62/457.5 |
| 5,116,240 A | 5/1992 | Wischhusen et al. | |
| 5,134,754 A | 8/1992 | Vickers | |
| 5,176,522 A | 1/1993 | Robertson, Jr. | |
| 5,190,156 A | 3/1993 | Conaway et al. | |
| 5,295,365 A | 3/1994 | Redford | |
| 5,297,616 A | 3/1994 | Pralus | |
| 5,411,140 A | 5/1995 | Byer | |
| 5,454,471 A * | 10/1995 | Norvell | 206/545 |
| 5,467,853 A * | 11/1995 | Pelletier | 190/11 |
| 5,515,999 A | 5/1996 | Jo | |
| D371,942 S | 7/1996 | Lippincott et al. | |
| 5,535,883 A | 7/1996 | Henderson | |
| 5,544,751 A | 8/1996 | Klodt et al. | |
| 5,649,638 A | 7/1997 | Roy et al. | |
| 5,699,925 A | 12/1997 | Petruzzi | |
| 5,747,084 A | 5/1998 | Cochran et al. | |
| 5,772,063 A | 6/1998 | Gantz-Bloome | |
| 5,781,853 A | 7/1998 | Johnson | |
| D408,222 S | 4/1999 | Carter | |
| 5,957,325 A | 9/1999 | Montanez | |
| 6,070,702 A | 6/2000 | Der Kinderen | |
| 6,116,456 A | 9/2000 | Davis | |
| 6,138,558 A | 10/2000 | Harrington | |
| 6,202,847 B1 | 3/2001 | Hardy et al. | |
| 6,234,677 B1 * | 5/2001 | Mogil | 383/110 |
| 6,392,201 B1 * | 5/2002 | Owens | 219/387 |
| 6,561,329 B2 * | 5/2003 | Stobbs et al. | 190/112 |
| 6,688,470 B2 * | 2/2004 | Dege et al. | 206/545 |

* cited by examiner

FOOD CARRIER

CROSS-REFERENCE TO RELATED APPLICATIONS

The present application is a continuation of U.S. patent application Ser. No. 10/968,436, filed Oct. 19, 2004, entitled FOOD CARRIER, which is a continuation of U.S. patent application Ser. No. 10/223,128, filed Aug. 19, 2002, now abandoned entitled FOOD CARRIER, which is a continuation-in-part of commonly assigned, U.S. patent application Ser. No. 10/073,832, now U.S. Pat. No. 6,688,470, filed Feb. 11, 2002, entitled FOOD CARRIER, the content of each being hereby incorporated herein by reference.

BACKGROUND OF THE INVENTION

The present invention relates to a food carrier, and in particular to a food carrier for carrying a plurality of meal containers in a stacked orientation, and allowing for removal of the meal containers from a lower portion of the carrier.

Food carriers are used in a wide variety of applications, such as for carrying liquids and/or prepackaged foods. Food carriers typically a top loading area, whereby meal containers or trays may be loaded within the food carrier, and a lower removal area from which the meal trays may be removed from within the food carrier.

Heretofore, food carriers have typically been constructed of a rigid, nondeformable material such as plastic or metal and have had significantly complicated designs. Specifically, the materials from which typical food carriers have been constructed are heavy and/or are prone to fracture and/or rupture if impacted or dropped. Most food carriers included housings constructed of multiple components that required assembly subsequent to fabrication of the individual parts. In addition, doors for previous food carriers were typically fastened via complicated hinge assemblies. Other designs allowed for "floating" door/lids and provided no means for positive engagement thereof. Further, no positive means for locking the doors in a closed position were provided to prevent the doors from accidentally opening and the associated meal trays from inadvertently falling out of the food carrier. Still further, previous food carrier designs have included apertures located in a top wall thereof covered by a lid which required removal in order to load the meal trays therein. The removal of the lid to allow loading necessarily allowed significant amounts of heat to escape from within the housing each time additional meal containers were placed therein.

SUMMARY OF THE INVENTION

One aspect of the present invention is to provide a method for carrying a plurality of food containers that includes an insulated housing having a closed bottom, a closed top located substantially vertically above the bottom, and at least one side wall having a first opening proximate the top of the housing and a second opening proximate the bottom of the housing, the first opening being sized to receive at least one meal container therethrough, the second opening being sized to allow removal of at least one meal container from within the housing as received within the housing from the first opening and to preclude simultaneous removal of all of the meal containers from within the housing, thereby limiting heat transfer from within the housing. The method also includes providing a first door operably connected with the housing, the first door movable between an open position, wherein at least one meal container may be loaded into the housing via the first opening, and a closed position, wherein the first door covers the first opening, thereby limiting heat transfer from within the housing, and a second door operably connected with the housing, the second door movable between an open position, wherein at least one meal container as received within the housing from the first opening may be removed from within the housing via the second opening, and a closed position, wherein the second door covers the second opening, thereby limiting heat transfer from within the housing. The method further includes moving the first door into the open position of the first door and the second door into the closed position of the second door, placing at least one meal container into the housing through the first opening, moving the first door into the closed position of the first door and the second door into the open position of the second door, and removing the at least one meal container from the housing through the second opening.

Another aspect of the present invention is to provide a method for carrying a plurality of food containers that includes providing an insulated housing constructed of a flexible fabric having a closed bottom, a closed top located substantially vertically above the bottom, and at least one side wall having a first opening proximate the top of the housing and a second opening proximate the bottom of the housing, the first opening being sized to receive at least one meal container therethrough, the second opening being sized to allow removal of at least one meal container from within the housing as received within the housing from the first opening and to preclude simultaneous removal of all of the meal containers from within the housing, thereby limiting heat transfer from within the housing. The method also includes providing a first door operably connected with the housing, the first door movable between an open position, wherein at least one meal container may be loaded into the housing via the first opening, and a closed position, wherein the first door covers the first opening, thereby limiting heat transfer from within the housing and a second door operably connected with the housing, the second door movable between an open position, wherein at least one meal container as received within the housing from the first opening may be removed from within the housing via the second opening, and a closed position, wherein the second door covers the second opening, thereby limiting heat transfer from within the housing. The method further includes moving the first door into the open position of the first door and the second door into the closed position of the second door, placing a plurality of meal containers into the housing through the first opening, wherein the plurality of meal containers stack directly upon one another, moving the first door into the closed position of the first door and the second door into the open position of the second door, and removing at least one of the plurality of meal containers from the housing through the second opening.

The present invention provides a method of providing a food carrier for carrying a plurality of meal containers that is more durable, has a reduced manufacturing costs, includes an uncomplicated design that is economical to manufacture, capable of a long operating life, and is particularly well adapted to the proposed use. In addition, the present inventive food carrier is easy to clean and maintain, and provides positive closure when in use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
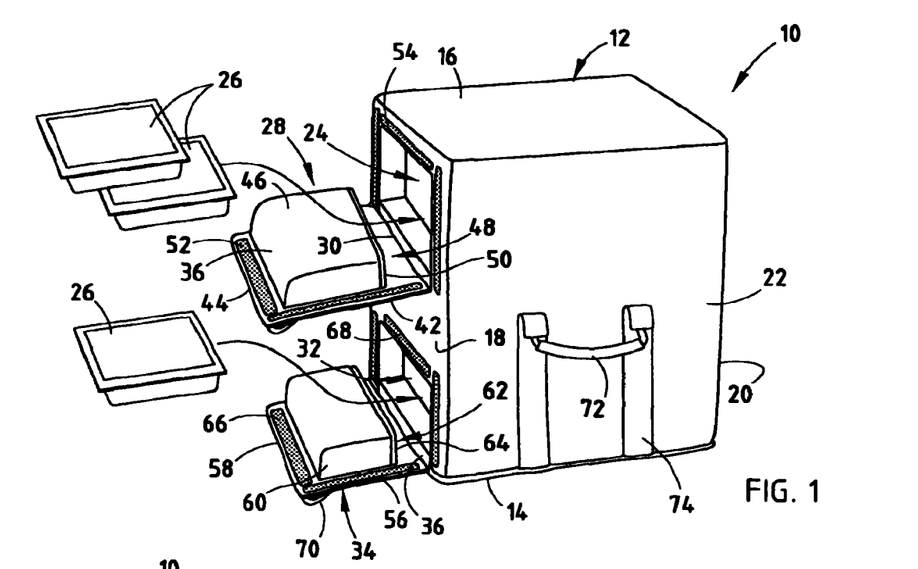
FIG. 1 is a perspective view of a food carrier embodying the present invention, with a first door and a second door in the open position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
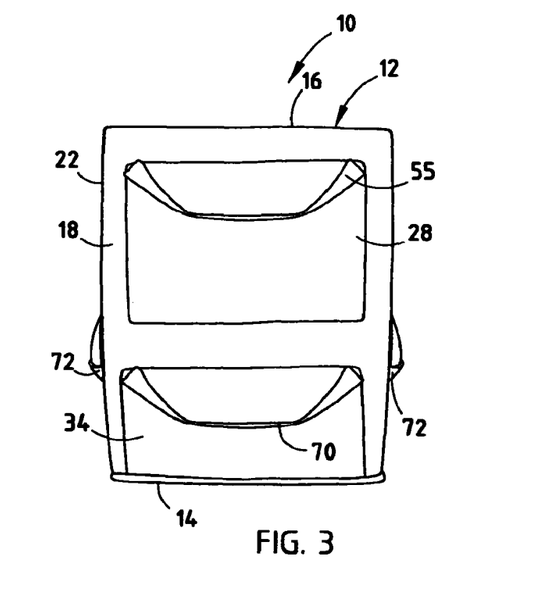
FIG. 3 is a front elevational view of the food carrier with the doors in a closed position.
Figure 4:
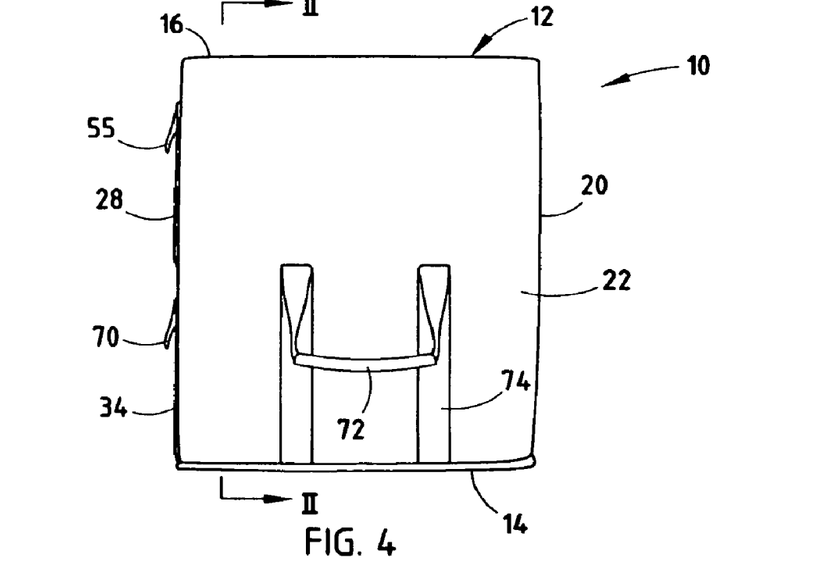
FIG. 4 is a side elevational view of the food carrier.

The reference numeral 10 (FIG. 1) generally designates a food carrier embodying the present invention. In the illustrated example, food carrier 10 includes a housing 12 constructed of a flexible fabric and having a closed bottom 14, a closed top 16, a front wall 18, a back wall 20 and side walls 22. Front wall 18 includes a first opening 24 located adjacent top 16 of housing 12. Opening 24 is sized to allow the passage of meal containers 26 therethrough and placement of meal carriers 26 into housing 12. Food carrier 10 also includes a first door 28 constructed of a flexible fabric and operably connected with housing 12 by a living hinge 30. Door 28 is movable between an open position, as shown in FIG. 1, wherein meal containers 26 may be loaded into housing 12 via first opening 24, in a closed position, as shown in FIG. 3, wherein door 28 covers opening 24 of housing 12, thereby limiting heat transfer from within housing 12. Front wall 18 also includes a second opening 32 located adjacent bottom 14 of housing 12. Opening 32 is sized to preclude simultaneous removal of all of the plurality of meal containers 26 located within housing 12, thereby limiting heat transfer from within housing 12. Food carrier 10 further includes a second door 34 constructed of a flexible fabric and hingedly connected with housing 12 by a living hinge 36. Door 34 is movable between an open position, as shown in FIG. 1, wherein the meal containers may be removed from within housing 12 via opening 32 within front wall 18 of housing 12, and a closed position, as shown in FIG. 3, wherein door 34 covers opening 32 within front wall 18 of housing 12, thereby limiting heat transfer from within housing 12. Although in the illustrated example housing 12, door 28 and door 34 are each preferably constructed of a flexible fabric, other suitable materials may be utilized including lightweight metals, hard plastics, cloths, woven mesh plastics, etc.

Figure 2:
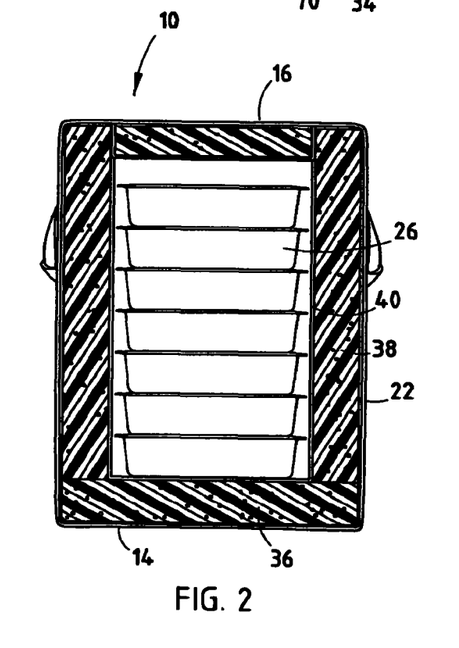
FIG. 2 is a cross-section front view of the food carrier, taken along the line II-II, FIG. 4.

As best illustrated in FIG. 2, bottom 14, top 16, front wall 18, back wall 20 and side walls 22 are provided with a layer of insulation 38 therein. Housing 12 also includes a plastic inner coating or layer 40 covering the interior surfaces of bottom 14, top 16, front wall 18, back wall 20 and side walls 22. As illustrated, coating 40 is constructed of a plastic material, however, other materials providing easy cleaning of the interior of housing 12 may be substituted therefore.

Door 28 further includes a flexible fabric handle 55 that facilitates movement of door of 28 between the open and closed positions. The first door 28 includes a paneled section 42 that includes hinge 30 and an attachment flap 44. Hinge 30 extends laterally across front wall 18 of housing 12 and is sewn thereto. Door 28 further includes a centrally located, rectangularly-shaped envelope 36 attached to panel section 42 and defining an open end 48. A block of insulation 50 is inserted within open end 48 of envelope 46. In the illustrated example, insulation block 50 has a rectangular shape that substantially matches the size of the first opening 24 within front wall 18, thereby ensuring a snug fit of door 28 with housing 12. Open end 48 of envelope 46 allows insulation block 50 to be easily replaced or removed for cleaning if the interior of housing 12 is soiled by the contents within meal containers 26, thereby ensuring an antiseptic interior to housing 12. Door 28 is held in the closed position via a plurality of hook-and-loop type fabric fasteners 52 that extend along flap 44 of door 28. A plurality of cooperating hook-and-loop type fabric fasteners 54 are attached to front wall 18 and extend about the periphery of opening 24. Although in the illustrated example, the hook-and-loop type fabric fasteners 52 and 54 are utilized to hold door 28 in the closed position with housing 12, other suitable fasteners may be substituted therefor. Alternatively, hinge 30 of door 28 may be fastened to housing 12 via a hook-and-loop type fabric fastener, thereby allowing door 28 to be completely removed from housing 12 to facilitate the loading of containers 26 therein.

The door 34 includes a paneled section 56, and outwardly extending attachment flap 58, and living hinge 36. Hinge 36 is an extension of panel section 56 and is sewn to front wall 18 of housing 12. Alternatively, a hook-and-loop type fabric connector (not shown) may be utilized to attach door 34 to housing 12, thereby allowing door 34 to be completely removed from housing 12. Door 34 further includes a centrally located, rectangularly-shaped envelope 60. Envelope 60 is sewn to paneled section 56 of door 34 and defines an open end 62 within which an insulation block 64 may be placed within envelope 60. Open end 62 of envelope 60 allows insulation block 64 to be replaced or removed for cleaning if soiled by the contents within containers 26, thereby ensuring an antiseptic interior to housing 12. A plurality of hook-and-loop type fabric fasteners 66 extend along flap 58 of paneled section 56, and mate with a plurality of cooperating hook-and-loop type fabric fasteners 68 extending about opening 32 within front wall 18. Although in the illustrated example, the hook-and-loop type fabric fasteners are utilized to hold door 34 in the closed position, other suitable fasteners may be utilized. Door 34 further includes a flexible fabric handle 70 that facilitates movement of door 34 between the open and closed positions.

Figure 5:
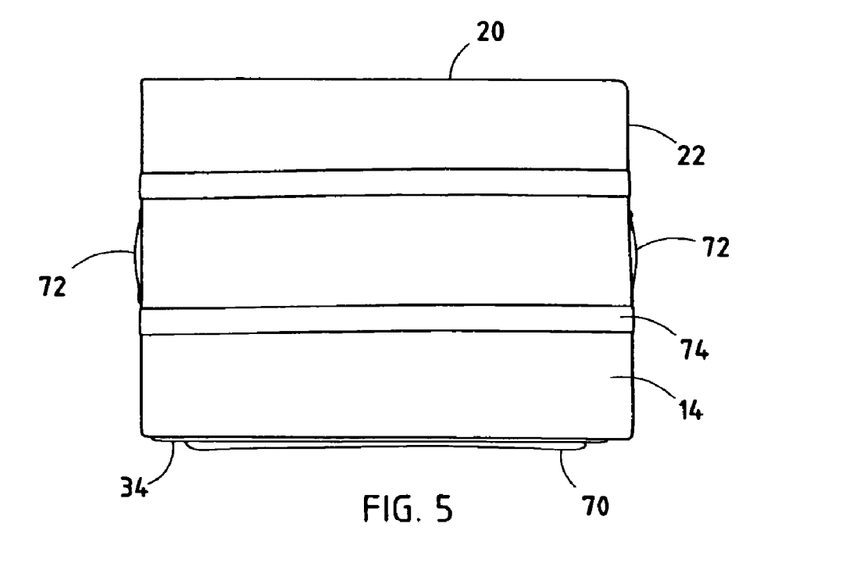
FIG. 5 is a bottom plan view of the food carrier.

Housing 12 also includes a pair of handles 72 extending outwardly from side walls 22. A pair of structural support straps 74 (FIG. 5) extend along side walls 22 and across bottom 14 of housing 12. As illustrated, handles 72 and support straps 74 are constructed of a single piece of woven nylon webbing sewn to housing 12, however, multiple pieces of other materials suitable for such use may be substituted therefore and attached by any suitable means.

In operation, door 28 is moved to the open position, thereby allowing the plurality of meal containers 26 to be placed within housing 12 via opening 24. Door 28 is then moved to the closed position and secured in place via fasteners 52 and 54. Individual meal containers 26 are removed via opening 32 within front wall 18 of housing 12 by moving door 34 to the open position. As illustrated, only a single meal container 26 may be removed from within housing 12 via opening 32 at a time, however, opening 32 may be enlarged depending on the particular use and/or size of meal containers 26.

Figure 6:
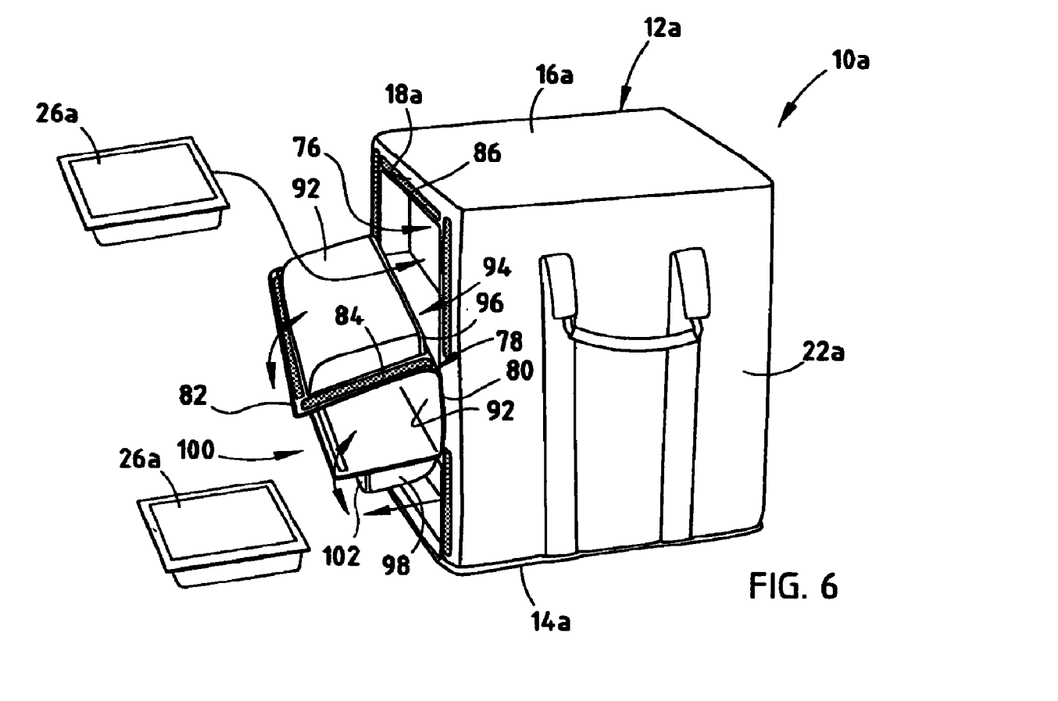
FIG. 6 is a perspective view of an alternative embodiment of the food carrier.
Figure 7:
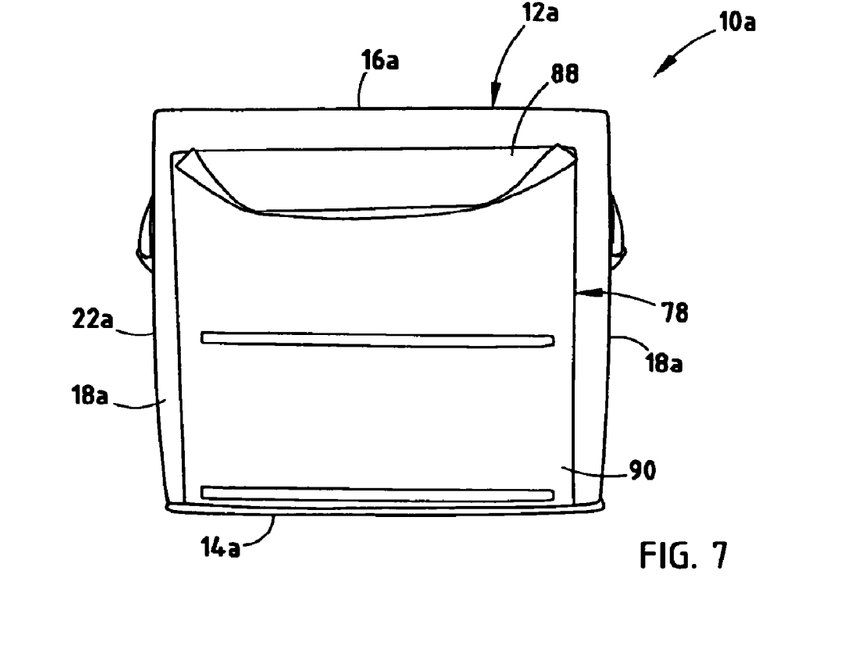
FIG. 7 is a front elevational view of the alternative embodiment of the food carrier.

The reference numeral 10a (FIG. 6) generally designates another embodiment of the present invention. Since food carrier 10a is similar to the previously described food carrier 10, similar parts appearing in FIGS. 1-5 and FIGS. 6 and 7 are represented by the same, corresponding reference numeral, except for the suffix "a" in the numerals of the latter. Food carrier 10a is similar in construction to food carrier 10 with the notable exception being that food carrier 10a includes a single front opening 76 extending from proximate top 16a to bottom 14a and providing access to the interior of housing 12a. A single door 78 constructed of flexible fabric is connected with housing 12a and includes a paneled section 80 and an attachment flap 82 extending about the periphery thereof. Door 78 is operably attached to housing 12a via a plurality of hook-and-loop type fabric fasteners 84 extending about flap 82 and a plurality of corresponding hook-and-loop type fabric fasteners 86 fixedly attached to front wall 18a of housing 12a and extending about the periphery of opening 76. Door 78 includes an upper portion 88 and a lower portion 90 operable to allow the loading and unloading of meal trays 26 from within housing 12a, respectively. Specifically, upper portion 88 is movable between an open position, as shown in FIG. 6, wherein meal containers 26a may be loaded into housing 12a via an upwardly located section of opening 76, and a closed position, as shown in FIG. 7, wherein upper portion 88 of door 78 covers the upper section of opening 76, thereby limiting heat transfer from within housing 12a. Lower portion 90 of door 80 is movable between an open position, as shown in FIG. 6, wherein meal containers 26a may be removed from within housing 12a via a lower section of opening 76, and a closed position, as shown in FIG. 7, wherein lower portion 90 of door 78 covers the lower section of opening 76, thereby limiting heat transfer from within housing 12. The movement of upper portion 88 and lower portion 90 of door 78 define a living hinge 92 therebetween. Although in the illustrated example, housing 12a and door 78 are each constructed of a flexible fabric, other suitable materials may be utilized including cloth, woven mesh plastics, rigid plastics, lightweight metals, etc.

In the illustrated example, the door 78 includes an upwardly located, rectangularly-shaped upper envelope 92 attached to panel section 80 and defining an open end 94. A block of insulation 96 is inserted within open end 94 of envelope 92. In the illustrated example, insulation block 96 has a rectangular shape that substantially matches the size of the upper section of opening 76, thereby ensuring a snug fit of the upper portion 88 of door 78 within opening 76. Lower portion 90 of door 78 includes a rectangularly-shaped envelope 98 defining an open end 100. A block of insulation 102 is inserted within open end 100 of envelope 98. In the illustrated example, insulation block 102 has a rectangular shape that substantially matches the size of the lower section of opening 76, thereby ensuring a snug fit of lower portion 90 of door 78 within opening 76. Open end 94 of envelope 92 and open end 100 of envelope 98 allows insulation blocks 96 and 102 to be easily replaced or removed for cleaning if soiled by the contents within meal containers 26a, thereby ensuring an antiseptic interior to housing 12a.

In operation, upper portion 88 of door 78 is moved to the open position, thereby allowing the plurality of meal containers to be placed within housing 12a via an upper section of opening 76. It should be noted that upper portion 88 of door 78 may be selectively opened to any required width thereby allowing a single or multiple meal containers to be simultaneous placed within housing 12a. Individual meal containers 26a are removed via the lower section of opening 76 by moving lower portion 90 of door 80 to the open position. As illustrated, only a single meal container 26a is removed from within housing 12a at a time, however, lower portion 90 of door 78 may be selectively opened to any desired width, thereby allowing for the simultaneous removal of multiple meal containers 26a from within housing 12a. While the illustrated example shows a particular embodiment of door 78, it should be noted that any door that may be selectively opened from a top loading portion and a bottom unloading portion may be substituted therefore.

Figure 8:
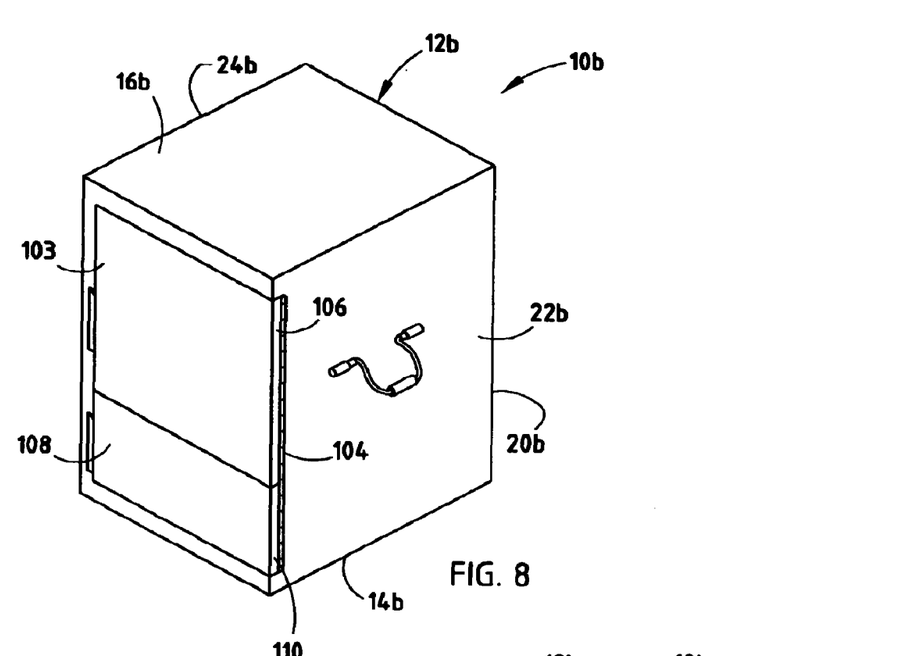
FIG. 8 is a perspective view of another alternative embodiment of the food carrier with a pair of doors in a closed position.
Figure 9:
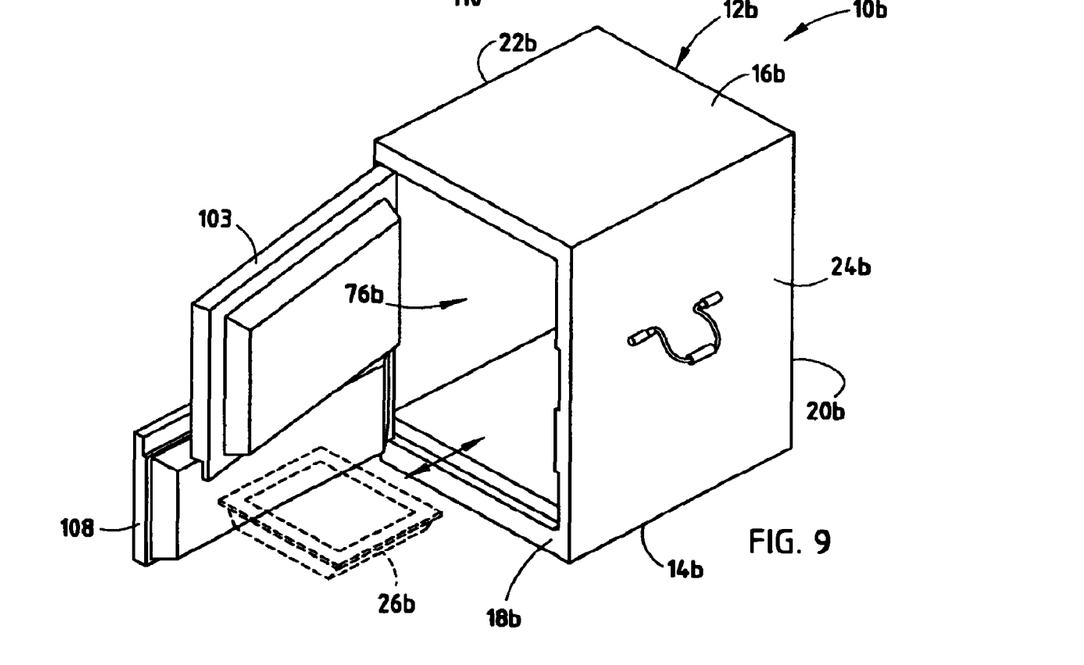
FIG. 9 is a perspective view of the food carrier of FIG. 8 with the doors in an open position.

The reference numeral 10b (FIGS. 8 and 9) generally designates another embodiment of the present invention. Since food carrier 10b is similar to the previously described food carrier 10a, similar parts appearing in FIG. 6 and FIGS. 8 and 9 are represented by the same, corresponding reference numeral, except for the suffix "b" in the numerals of the latter. Food carrier 10b is similar in construction to food carrier 10a with the notable exception being that food carrier 10b is preferably constructed of a rigid material such as plastic, although other suitable materials may be substituted therefore. An insulated upper door 103 constructed of rigid plastic is operably attached to insulated housing 12b via a piano-type hinge 104 extending along an edge 106 thereof. Upper door 103 is movable between an open position, as shown in FIG. 9, wherein meal containers 26b may be loaded into housing 12b via an upwardly located section of opening 76b, and a closed position, as shown in FIG. 8, wherein upper door 103 covers the upper section of opening 76b, thereby limiting heat transfer from within housing 12b. An insulated lower door 108 constructed of rigid plastic is connected with housing 12b via hinge 104 extending along an edge 110 thereof. Lower door 108 is movable between an open position, as shown in FIG. 9, wherein meal containers 26b may be removed from within housing 12b via a lower section of opening 76b, and a closed position, as shown in FIG. 8, wherein lower door 108 covers the lower section of opening 76b, thereby limiting heat transfer from within housing 12b. The doors 103 and 108 are each constructed to provide an in-lay fit within housing 126 when in the closed position. Although in the illustrated example, housing 12b, upper door 103 and lower door 108 are each constructed of a rigid plastic, other suitable materials may be utilized including flexible fabric, cloth, woven mesh plastics, lightweight metals, etc.

In operation, upper door 103 is moved to the open position, thereby allowing the plurality of meal containers to be placed within housing 12b via an upper section of opening 76b. Individual meal containers 26b are removed via the lower section of opening 76b by moving lower door 108 to the open position. As illustrated, only a single meal container 26b is removed from within housing 12b at a time, however, lower door 108 may be constructed to any desired width, thereby allowing for the simultaneous removal of multiple meal containers from within housing 12b.

Figure 10:
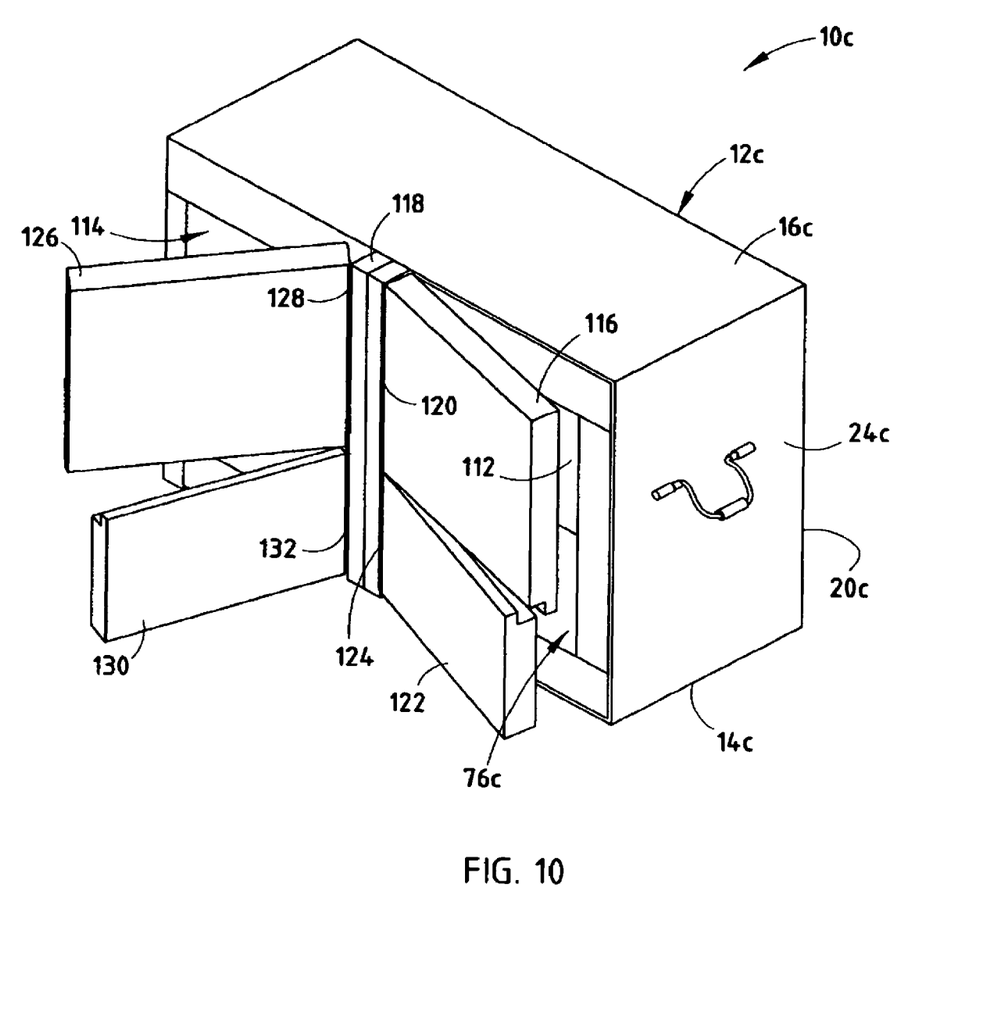
FIG. 10 is a perspective view of yet another alternative embodiment of the food carrier with a plurality of doors in an open position.

The reference numeral 10c (FIG. 10) generally designates another embodiment of the present invention. Since food carrier 10c is similar to the previously described food carrier 10b, similar parts appearing in FIGS. 8 and 9 and FIG. 10 are represented by the same, corresponding reference numeral, except for the suffix "c" in the numerals of the latter. Food carrier 10c is similar in construction to food carrier 10b with the notable exception being that the interior space of the food carrier 10c is divided into a first section 112 and a second section 114. An insulated first upper door 116 constructed of a rigid plastic is operably connected to a central beam 118 of the insulated housing 12c via a piano-type hinge 120 extending along an edge thereof. The first upper door 116 is movable between an open position, wherein the meal container 26 (FIG. 1) may be loaded into the housing 12c via an upwardly located section of the first portion of the opening 76c, and a closed position, wherein the first upper door 116 covers the upper section of the first portion of the opening 76c, thereby limiting heat transfer from within the housing 12c. An insulated first lower door 122 is constructed of a rigid plastic and is connected with the beam 118 of the housing 12c via a piano-type hinge 124 extending along an edge thereof. The first lower door 122 is movable between an open position, wherein the meal containers 26 (FIG. 1) may be removed from within the housing 12c via a lower section of the second portion 114 of the opening 76c, and a closed position, wherein the first lower door 122 covers the lower section of the second portion 114 of the opening 76c, thereby limiting heat transfer from within the housing 12c. An insulated second upper door 126 constructed of a rigid plastic is operably attached to an opposite side of the beam 118 from the first upper door 116 via a piano-type hinge 128. An insulated second lower door 130 is constructed of a rigid plastic and is connected with the beam 118 via a piano-type hinge 132 opposite the first lower door 122. The second upper door 126 and the second lower door 130 are operable similar to the first upper door 116 and the first lower door 122, respectively. Although in the illustrated example, the housing 12c, the upper doors 116 and 126, and the lower doors 122 and 130 are each constructed of a rigid plastic, other suitable materials may be utilized including flexible fabric, cloth, woven mesh plastics, lightweight metals, etc.

In operation, the upper doors 116 and 126 are moved to the open positions, thereby allowing a plurality of meal containers 26 to be placed within the first and second sections 112 and 114 of the interior of the housing 12c via an upper section of the opening 76c. Individual meal containers 26 are moved from within the first and second sections 112 and 114 of the interior of the housing 12c via the lower section of the opening 76c by moving the lower doors 122 and 130 to the open position. As illustrated, only a single meal container 26 is removed from within the first section 112 or the second section 114 at a time, however, the lower doors 122 and 130 may each be constructed to any desired width, thereby allowing for simultaneous removal of multiple meal containers 26 from within the housing 12c.

The present invention provides a controlled temperature food carrier for carrying a plurality of meal containers that is more durable, has a reduced manufacturing cost, includes an uncomplicated design that is economical to manufacture, is capable of a long operating life, and is particularly well adapted to the proposed use. In addition, the present inventive food carrier is easy to clean and maintain, and provides positive closure when in use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A method for carrying a plurality of meal containers, comprising:
    providing:
        an insulated housing having a closed bottom, a closed top located substantially vertically above the bottom, and at least one side wall having a first opening proximate the top of the housing and a second opening proximate the bottom of the housing, the first opening being sized to receive at least one meal container therethrough, the second opening being sized to allow removal of at least one meal container from within the housing as received within the housing from the first opening and to preclude simultaneous removal of all of the meal containers from within the housing, thereby limiting heat transfer from within the housing;
        a first door operably connected with the housing, the first door movable between an open position, wherein at least one meal container may be loaded into the housing via the first opening, and a closed position, wherein the first door covers the first opening, thereby limiting heat transfer from within the housing; and
        a second door operably connected with the housing, the second door movable between an open position, wherein at least one meal container as received within the housing from the first opening may be removed from within the housing via the second opening, and a closed position, wherein the second door covers the second opening, thereby limiting heat transfer from within the housing;
    moving the first door into the open position of the first door and the second door into the closed position of the second door;
    placing at least one meal container into the housing through the first opening;
    moving the first door into the closed position of the first door and the second door into the open position of the second door; and
    removing the at least one meal container from the housing through the second opening.

2. The method of claim 1, wherein the step of providing the first opening and the second opening further comprises the step of providing the first and second opening within the same side wall.

3. The method of claim 1, wherein the step of providing the housing and the doors further comprises the step of constructing the housing and the doors with a flexible fabric.

4. The method of claim 1, wherein the step of providing the doors further comprises the step of providing at least one hook-and-loop type fabric fastener to hold the doors in the closed position.

5. The method of claim 1, wherein the step of providing the housing further comprises providing a pair of handles fixedly attached to the housing and juxtaposed across the housing, and wherein the handles are constructed of a flexible fabric.

6. The method of claim 1, wherein the step of providing the housing further comprises providing at least one structural supporting strap that is fixedly attached to and extends across the bottom of the housing.

7. The method of claim 1, wherein the step of providing the housing further comprises providing a pair of handles constructed of a flexible fabric and juxtaposed across the housing and at least one structural supporting strap that extends across the bottom of the housing, wherein the handles and the supporting strap are constructed as a single piece.

8. The method of claim 1, wherein the step of providing the housing further comprises the step of constructing the housing with a rigid material.

9. The method of claim 8, wherein the step of providing the doors further comprises the step of constructing the doors with a rigid material.

10. A method for carrying a plurality of meal containers, comprising:

providing:

an insulated housing constructed of a flexible fabric having a closed bottom, a closed top located substantially vertically above the bottom, and at least one side wall having a first opening proximate the top of the housing and a second opening proximate the bottom of the housing, the first opening being sized to receive at least one meal container therethrough, the second opening being sized to allow removal of at least one meal container from within the housing as received within the housing from the first opening and to preclude simultaneous removal of all of the meal containers from within the housing, thereby limiting heat transfer from within the housing;

a first door operably connected with the housing, the first door movable between an open position, wherein at least one meal container may be loaded into the housing via the first opening, and a closed position, wherein the first door covers the first opening, thereby limiting heat transfer from within the housing; and a second door operably connected with the housing, the second door movable between an open position, wherein at least one meal container as received within the housing from the first opening may be removed from within the housing via the second opening, and a closed position, wherein the second door covers the second opening, thereby limiting heat transfer from within the housing;

moving the first door into the open position of the first door and the second door into the closed position of the second door;

placing a plurality of meal containers into the housing through the first opening, wherein the plurality of meal containers stack directly upon one another;

moving the first door into the closed position of the first door and the second door into the open position of the second door; and removing at least one of the plurality of meal containers from the housing through the second opening.

11. The method of claim 10, wherein the step of providing the doors further comprises the step of constructing the doors with a flexible fabric.

12. The method of claim 11, wherein the step of providing the doors further comprises the step of connecting the doors to the housing by living hinges.

13. The method of claim 12, wherein the step of providing the doors further comprises the step of providing at least one hook-and-loop type fabric fastener to hold the doors in the closed position.

14. The method of claim 13, wherein the step of providing the doors further comprises the step of providing an interior pocket within each door, and wherein the interior pocket of each door removably receives an insulation pad therein.

\* \* \* \* \*